United States Patent Office 3,031,656
Patented Apr. 24, 1962

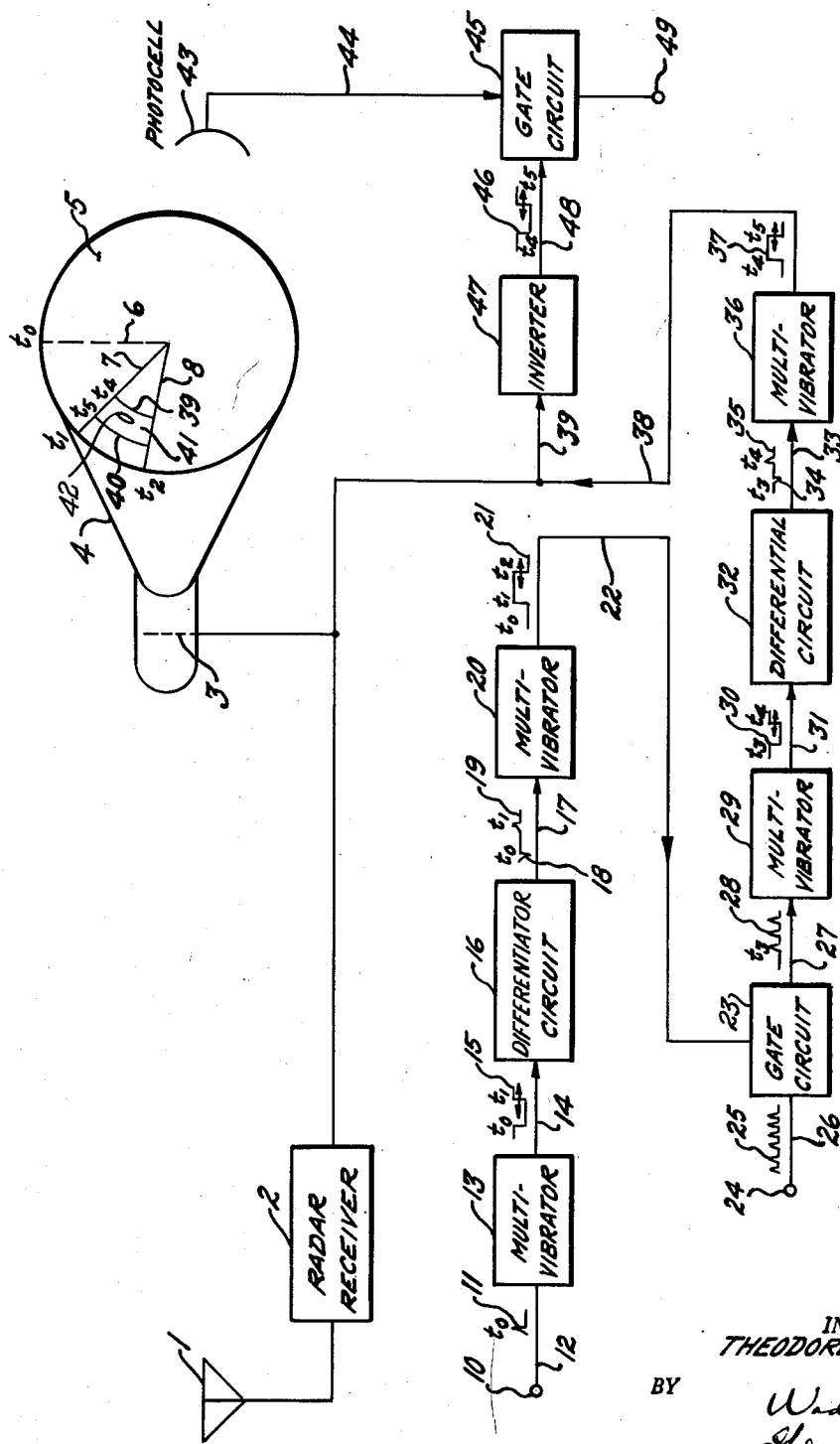

3,031,656
SYSTEM FOR CONTROLLING UNWANTED
RECEIVED RADAR SIGNALS
Theodore C. Wood, Kingston, N.Y., assignor to the United States of America as represented by the Secretary of the Air Force
Filed Apr. 22, 1960, Ser. No. 24,182
4 Claims. (Cl. 343—5)

The present invention relates to radar systems and more particularly to a system to eliminate unwanted received radar signals in a time displaced series of wanted and unwanted received radar signals.

In many radar applications, it is highly desirable to filter the output signals of a radar receiver, that is, to eliminate certain signals from the output such as noise, clutter, stationary objects and at times certain of the moving target signals, for example, friendly flying objects.

The radar receiver video output signal is usually displayed on a cathode-ray tube indicator in such manner as to show the time difference between the outgoing pulses from the radar transmitter and the return echoes from the target. In addition to indicating the time difference upon the screen of aforesaid cathode-ray tube indicator, the direction of the return echo may also be shown. Thus, the range and azimuth of the target may be indicated upon the screen of a cathode-ray tube, such a display is conventionally referred to as plan position indication. The radial displacement of the spot (representative of the target) from the center of the screen indicates range and the direction of the radial displacement indicates azimuth angle.

The video signals from the radar receiver are normally applied to the control electrode of a plan position indicator. The bias in the control electrode is adjusted to be just slightly greater than cutoff. Thus a video signal of significant amplitude causes the spot to be turned on. The result is that the echoes resulting from targets are presented on the screen as bright spots that give the range and azimuth of the target. The usual method of obtaining the radial deflection required in the PPI is to employ magnetic deflecting coils that are rotated synchronously with the radar antenna. It is to be noted that many radar systems that include PPI also include synchronization circuitry which provides range and azimuth synchronization signals.

In accordance with the present invention the azimuth synchronization signals are used to produce a gate signal whose start and stop time can occur at any desired azimuth setting. The aforesaid gate will allow all range synchronization signals which occur during the gate period to operate another gate generator which has a start and stop time at any desired range settings. These last-named gate signals are fed as blanking signals to the plan position indicator which normally displays both wanted and unwanted signals. The blanking signal is adjusted to blanket an unwanted signal. In the operation of the system of the present invention, the aforesaid term "blanking signal" is not utilized in the conventional sense of cutting off beam current, but is used in the sense of brightening a preselected area to such a magnitude that any unwanted signals appearing therein are not visible and in that sense the aforesaid unwanted signals are blanked. In the case of large unwanted and irregular shaped video signals, more than one blanking generator may be used. In addition to the foregoing, the present invention provides a photo-cell pick-up that scans the screen of the plan position indicator and the aforesaid blanking signal is utilized in such a way (for example, a gate circuit) to suppress the photo-cell output during the blanking period.

An object of the present invention is to provide a system for eliminating unwanted radar signals in a time displaced series of wanted and unwanted radar signals.

Another object of the present invention is to provide a system wherein a blanking signal may be applied to a plan position indicator in such a manner as to control the display appearing on any preselected portion of the associated indicator screen.

Still another object of the present invention is to provide a system wherein a photo-cell scans the controlled display appearing on the screen of a plan position indicator wherein a blanking signal is applied to aforesaid indicator to control the display and also is applied to suppress the photo-cell output during the blanking period.

Yet another object of the present invention is to provide a system wherein the display appearing on any preselected portion of the screen of a plan position indicator may be controlled by a blanking signal while a photo-cell scanning aforesaid screen is also controlled by aforesaid blanking signal.

For a better understanding of the invention, together with other and further objects thereof, reference is had to the following description taken in connection with accompanying drawing while its scope will be pointed out in the appended claims. The aforesaid accompanying drawing shows in block diagram form a preferred embodiment of the present invention which is a system for eliminating unwanted radar signals in a time displaced series of wanted and unwanted radar signals.

Referring now to the drawing, there is shown radar receiver 2 which receives signals including those representative of targets by way of antenna 1. Radar receiver 2 supplies video signals representative of the received signals. These video signals include wanted and unwanted signals, and are fed to control grid 3 of plan position indicator 4. Plan position indicator 4 is of the same type that is normally utilized with a conventional radar system. Plan position indicator 4 has its bias adjusted so that when a video signal of significant amplitude appears on control grid 3, a spot representative of the video signal appears on screen 5.

Now referring to the generation of a blanking signal, there is shown monostable multivibrator 13, which receives azimuth synchronization pulse 11 from terminal 10 by way of line 12. The azimuth synchronization pulse is supplied by a conventional radar in which the present invention is utilized. Azimuth synchronization pulse 11 is shown as beginning at time zero, $t_0$. The output signal from multivibrator 13 is fed to differentiator circuit 16 by way of line 14 and is shown on line 14 as pulse 15. The leading edge of pulse 15 starts at time zero, $t_0$, and the trailing edge occurs at time, $t_1$. The trailing edge represents the stop time of pulse 15 and the stop time is variable with respect to synchronizing pulse 11. A monostable multivibrator such as shown and described on pages 632–633 of Electronic and Radio Engineering, 4th edition, by F. E. Terman published by McGraw-Hill in 1955, may be utilized for aforesaid multivibrator 13. Circuit 16 differentiates pulse 15 and feed monostable multivibrator 20 by way of line 17. The pulse output of differentiator circuit 16 is shown on line 17 as pulse 18 and 19 respectively. Pulse 18 begins at time, $t_0$, and pulse 19 begins at time, $t_1$. Monostable multivibrator 20 is similar to multivibrator 13, but having an output which is a positive-going pulse. Multivibrator 20 is activated by pulse 19. The output signal from multivibrator 20 is pulse 21 shown on line 22. The leading edge of pulse 21 starts at time, $t_1$, and the trailing edge occurs at time, $t_2$. The trailing edge represents the stop time of pulse 21 and the stop time is variable with respect to pulse 19.

Pulse 21 is applied to gating circuit 23 by way of line 22. Simultaneously, gating circuit 23 receives range synchronization pulses from terminal 24 by way of line 26. Range synchronization pulses 25 are shown on line 26 and are supplied by the aforementioned radar in which the present invention is utilized. During the period that pulse 21 is applied to gating circuit 23, range synchronization pulses will appear on line 27 and are shown as pulses 28 having a time, $t_3$. Pulses 28 are fed to monostable multivibrator 29 by way of line 27. For each pulse input to multivibrator 29, there is supplied a pulse output therefrom such as shown as pulse 30 on line 31. The leading edge of pulse 30 begins at time, $t_3$, and the trailing edge occurs at time, $t_4$. The trailing edge represents the stop time of pulse 30 and the stop time is variable in respect to pulse 28. It is to be noted that multivibrator 29 is identical to multivibrator 13.

Pulse 30 is applied to conventional differentiator circuit 32 by way of line 31 and the output thereof appears on line 33 as negative pulse 34 having a time, $t_3$, and positive pulse 35 having a time, $t_4$. Pulse 35 triggers monostable multivibrator 36 and thereby operates to provide an output therefrom in the form of a positive pulse 37 appearing on line 38. The leading edge of pulse 37 begins at time, $t_4$, and the trailing edge occurs at time $t_5$. The trailing edge represents the stop time of pulse 37 and the stop time thereof is variable in respect to pulse 35. Multivibrator 36 is identical to multivibrator 20.

Positive pulse 37 is fed to the control grid of plan position indicator 4. As described hereinbefore, control grid 3 is also in receipt of wanted and unwanted signals in the form of video signals provided by the way of radar receiver 2. The aforesaid signals applied to control grid 3 of plan position indicator 4 operates to illuminate screen 5 so as to produce a spot for each of the applied signals. The spot being illuminated is then indicative of the range and direction of the object that has produced its associated video signal.

Now referring to screen 5 in detail, there is shown azimuthal lines 6, 7, and 8, said lines being representative of times, $t_0$, $t_1$, and $t_2$ respectively. There is also shown range lines 39 and 40, said lines being representative of times, $t_4$ and $t_5$, respectively. Thus, there is a rectangular like portion 41 on screen 5 bounded by portion of lines 7, 8, 39 and 40. When positive pulse 37 is applied to control grid 3, aforementioned rectangular like portion 41 of screen 5 is illuminated. During this period of illumination, only unwanted signal, such as spot 42, that appears as an illuminated spot on rectangular like portion 41 has its definition partially suppressed. Thus, a preselected area of the screen of a plan position indicator may be controlled in such a fashion as to indicate an area of unwanted signals. The unwanted signal is displayed in rectangular portion 41 of screen 5, but such a display is partially suppressed by reason of the aforesaid further illumination of rectangular portion 41. If desired the amplitude of pulse 37 may be made large enough to blanket area 41 and thus blanket entirely the display of any unwanted signals appearing on the face of screen 5.

Again referring to screen 5, photo-cell pick-up 43 is positioned so as to scan any display representative of received signals occurring on screen 5. Photo-cell 43 produces an output signal for each illuminated area appearing on screen 5. Thus an output signal from photo-cell 43 is provided which is representative of illuminated area 41 and it is applied to gate circuit 45 by way of line 44. Simultaneously, gate circuit 45 receives negative pulse 46 which is provided by feeding positive pulse 37 through inverter 47. Negative pulse 46 is shown on line 48 and the leading edge thereof begins at time, $t_4$, and the trailing edge is variable about time, $t_5$. During the period pulse 46 is applied to gate circuit 45, any signal from photo-cell 43 representative of aforementioned area 41 is also being applied to gate circuit 45 and will be suppressed as pulse 46 will operate on gate circuit 45 so as to prevent an output signal therefrom during periods of pulse 46. Gate circuit 45 is effectively switched off during the period of pulse 46 so that no output signal will appear at terminal 49. Thus only wanted signals will be available at terminal 49 and unwanted signals will be suppressed.

Thus any preselected portion of the screen of a plan position indicator may be precisely controlled and aforesaid plan position indicator in combination with a photo-cell pickup may be utilized to eliminate unwanted signals in a time displaced series of wanted and unwanted signals.

While there has been described what is at present considered to be the preferred embodiment of the invention it will be apparent to those skilled in the art that various changes and modifications may be made therein without departing from the spirit or scope of the invention.

What is claimed is:

1. For use in a radar, a system for controlling the display of unwanted radar signals upon the screen of a plan position indicator associated with said radar comprising means to display upon said screen of said plan position indicator all of the received radar signals, means to generate a first gate pulse having a start time coinciding with one preselected azimuth setting and having a stop time coinciding with another preselected azimuth setting, means to deliver range synchronization pulses supplied by said radar during periods of said first gating pulse, means to generate a pulse for each of said delivered pulse, said generated pulse having a start time at one preselected range and a stop time at another preselected range, and means to apply said generated pulses to said plan position indicator to control the degree of illumination of said screen associated therewith.

2. For use in a radar, means for controlling the display on the screen of a plan position indicator associated with said radar comprising means to display received radar signals on said screen of said plan position indicator, first means to generate a first pulse having a leading edge coinciding with one preselected azimuth position and having a trailing edge coinciding with another preselected azimuth position, said first generating means operating in accordance with azimuth synchronization pulses supplied by said radar, means to deliver range synchronization pulses supplied by said radar during periods of said first pulse, second means for generating a pulse for each of said range synchronization pulses, said pulse having a leading edge coinciding with one preselected range and having a trailing edge coinciding with another preselected range, and means to illuminate preselected areas of said screen of said plan position indicator in accordance with said output pulse of said second generating means.

3. For use in a radar, means for controlling the display on the screen of a plan position indicator associated with said radar as described in claim 2 further including photo-cell means to scan said screen, said photo-cell means providing an output signal for each illuminated spot on said screen, and means to suppress said photo-cell output signal during periods of illumination of said preselected areas.

4. For use in a radar, a system for controlling the display on the screen of a plan position indicator associated with said radar comprising a plan position indicator, means to display received signals on the screen of said plan position indicator by illuminating a spot on said screen for each of said received signals, means to further illuminate a preselected area of said screen to suppress unwanted received signals, photo-cell means to scan said screen thus supplying an output signal therefrom for each illuminated spot appearing on said screen, and means to suppress said output signal from said photo-cell means during periods of illumination of said preselected areas.

References Cited in the file of this patent

UNITED STATES PATENTS

| | | |
|---|---|---|
| 2,532,566 | Millman | Dec. 5, 1950 |
| 2,640,984 | Sherwin | June 2, 1953 |
| 2,668,286 | White | Feb. 2, 1954 |
| 2,682,657 | Haworth | June 29, 1954 |
| 2,709,804 | Chance | May 31, 1955 |
| 2,855,589 | Baker et al. | Oct. 7, 1958 |
| 2,903,690 | Slack | Sept. 8, 1959 |